US008959115B2

(12) United States Patent
Marathe

(10) Patent No.: US 8,959,115 B2
(45) Date of Patent: Feb. 17, 2015

(54) PERMISSION TRACKING SYSTEMS AND METHODS

(75) Inventor: Nikhil Marathe, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 630 days.

(21) Appl. No.: 12/833,387

(22) Filed: Jul. 9, 2010

(65) Prior Publication Data

US 2012/0011161 A1    Jan. 12, 2012

(51) Int. Cl.
*G06F 17/30* (2006.01)
*G06F 7/00* (2006.01)
*G06F 21/60* (2013.01)
*G06Q 10/06* (2012.01)

(52) U.S. Cl.
CPC .............. *G06F 21/604* (2013.01); *G06Q 10/06* (2013.01)
USPC .............................................. 707/785; 726/2

(58) Field of Classification Search
CPC ..... G06F 21/30; G06F 21/6218; H04L 63/10; H04L 63/101
USPC ......................................... 707/785; 726/1–2
See application file for complete search history.

(56) References Cited

U.S. PATENT DOCUMENTS

| | | | | |
|---|---|---|---|---|
| 6,202,066 | B1 * | 3/2001 | Barkley et al. ................ | 707/785 |
| 6,950,825 | B2 * | 9/2005 | Chang et al. ........................ | 1/1 |
| 7,506,055 | B1 * | 3/2009 | Qin ................................ | 709/225 |
| 7,606,801 | B2 * | 10/2009 | Faitelson et al. ...................... | 1/1 |
| 7,669,244 | B2 * | 2/2010 | Smith ............................. | 726/26 |
| 8,117,230 | B2 * | 2/2012 | Shaji et al. ..................... | 707/786 |
| 8,266,176 | B2 * | 9/2012 | Nakamura et al. ............ | 707/781 |
| 8,601,539 | B1 * | 12/2013 | Bobel ............................... | 726/2 |
| 2002/0026592 | A1 * | 2/2002 | Gavrila et al. ................ | 713/201 |
| 2005/0138420 | A1 * | 6/2005 | Sampathkumar et al. .... | 713/201 |
| 2005/0165656 | A1 * | 7/2005 | Frederick et al. ............... | 705/26 |
| 2006/0074754 | A1 * | 4/2006 | Toyohara et al. ............... | 705/14 |
| 2006/0236381 | A1 * | 10/2006 | Weeden ............................ | 726/6 |
| 2006/0277184 | A1 * | 12/2006 | Faitelson et al. ................... | 707/9 |
| 2007/0039045 | A1 * | 2/2007 | McKee et al. .................... | 726/21 |
| 2007/0244899 | A1 * | 10/2007 | Faitelson et al. ................... | 707/9 |
| 2009/0100058 | A1 * | 4/2009 | Faitelson et al. ................... | 707/9 |
| 2012/0240242 | A1 * | 9/2012 | Ferenczi et al. ................ | 726/28 |

* cited by examiner

*Primary Examiner* — Jeffrey A Burke
(74) *Attorney, Agent, or Firm* — Wilmer Cutler Pickering Hale and Dorr LLP

(57) ABSTRACT

Systems and methods for permission maintenance are presented. In one embodiment, a permission maintenance method includes: gathering permission indication information including permission indications associated with various stored information; analyzing the permission indication information including analyzing potential permission indication origination; and creating interface presentation information based upon results of the analyzing the permission indications, wherein the interface presentation information includes information related to potential origination of a permission indication. The gathering can include scanning a file system and collecting active directory information. The analyzing can include determining the type of access a principal is given to a file. The analyzing can also include determining if a principal is associated with a group and the type of permissions given to the group. In one exemplary implementation, the permission indication information is organized in accordance with potential permission indication origination. In one embodiment, the interface presentation information is presented in a Graphical User Interface, including a permission indicator and the information related to potential origination of the permission indicator.

20 Claims, 16 Drawing Sheets

600

610
Gathering permission indication information.

620
Analyzing the permission indication information.

630
Creating interface presentation information.

710
Gathering storage path component information for a designated storage object or path component.

720
Retrieving indications of user groups a designated user belongs to.

730
Gathering permission indication information for the designated user and user groups identified in block 720 for each path component identified in block 710.

810
Parsing permission indication information.

820
Determining a potential permission indication origination.

910
Developing the presentation configuration information.

920
Assigning information for populating the cells of the array.

FIG 9

|  | Path Component 1121 | Path Component 1122 | Path Component 1123 | Effective Permissions for Path Component 1123 |
|---|---|---|---|---|
| Principal 1111 (User A) |  |  | Control Point Permission Indicator 1141 | Permission Indicator 1141 |
| Principal 1112 (Group B) |  |  |  |  |
| Principal 1113 (Group B) |  | Control Point Permission Indicator 1142 |  | Permission Indicator 1142 |
|  |  |  |  |  |

FIG 11

|  | Directory 101 | Folder 110 | File 111 | Effective Permissions for Path Component 111 |
|---|---|---|---|---|
| Principal D (User 194) |  |  |  |  |
| Principal C (Group) | Control Point Permission Indicator (RW) |  |  | Permission Indicator (RW) |
|  |  |  |  |  |
|  |  |  |  |  |

FIG 12

|  | Directory 101 | Folder 110 | File 111 | Effective Permissions for Path Component 111 |
|---|---|---|---|---|
| Principal D (User 194) |  |  |  |  |
| Principal C (Group) | Control Point Permission Indicator (RW) | Control Point Permission Indicator (R) |  | Permission Indicator (R) |
|  |  |  |  |  |
|  |  |  |  |  |

FIG 13

|  | Directory 101 | Folder 140 | Folder 150 | File 170 | Effective Permissions for Path Component 170 |
|---|---|---|---|---|---|
| Principal D (User 194) |  | Control Point Permission Indicator (RWX) | Control Point Permission Indicator (R) |  | Permission Indicator (R) |
| Principal C (Group ) | Control Point Permission Indicator (RW) |  |  |  |  |
|  |  |  |  |  |  |
|  |  |  |  |  |  |

FIG 14

|  | Directory 101 | Folder 140 | Folder 150 | File 170 | Effective Permissions for Path Component 170 |
|---|---|---|---|---|---|
| Principal D (User 194) |  | Control Point Permission Indicator (RWX) | Control Point Permission Indicator (RW) |  | Permission Indicator (RW) |
| Principal C (Group ) | Control Point Permission Indicator (RW) |  |  |  |  |
|  |  |  |  |  |  |
|  |  |  |  |  |  |

FIG 15

| Tom's permissions on folder- \\netapp1\Finshare\Finance\Payroll | | | | |
|---|---|---|---|---|
| User Groups for user Tom | Finshare | 📄 Finance | 📄 Payroll | 📄 Effective on payroll |
| 🌸 guests@mydomain | | R W | | |
| 🌸 accounts@mydomain | | R | | R |
| 👤 tom@mydomain | | R | R W | R W |
| 👤 effective for tom@mydomain | | R | R W | R W |

Permission tracking module.

> 1410
>
> Permission indication information gathering module.

> 1420
>
> Permission indication information analysis module.

> 1430
>
> Interface presentation information creation module.

FIG 17

PERMISSION TRACKING SYSTEMS AND METHODS

FIELD OF THE INVENTION

The present embodiments relate to the field of information storage replication.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Maintaining and tracking appropriate access or permission to the information is often very important for a variety or reasons (e.g., corruption prevention, system maintenance, etc.).

Many organizations typically attempt to manage and maintain permissions to vast amounts of stored information, ranging from relatively public information to highly sensitive and confidential information. Further complicating the attempts are the numerous individuals and groups that have an interest in some or all of the information. Maintaining and tracking which permission each individual user has to particular information and analyzing the appropriateness of the permission is typically very complex and complicated. Traditional permission assignment and tracking approaches are often limited and do not readily include indications of how a permission originated. Administrators traditionally have to expend significant resources and labor tracking and analyzing permissions and the origination of permissions. It can be extremely complex to detect the source of a permission grant or denial of access rights. Typically even more resources are expended attempting to coordinate remediation, permission alterations and permission corrections.

SUMMARY

Systems and methods for permission maintenance are presented. In one embodiment, a permission maintenance method includes: gathering permission indication information including permission indications associated with various stored information; analyzing the permission indication information including analyzing potential permission indication origination; and creating interface presentation information based upon results of the analyzing the permission indications, wherein the interface presentation information includes information related to potential origination of a permission indication. The gathering can include scanning a file system and collecting active directory information. The analyzing can include determining the type of access a principal is given to a file. The analyzing can also include determining if a principal is associated with a group and the type of permissions given to the group. In one exemplary implementation, the permission indication information is organized in accordance with potential permission indication origination. In one embodiment, the interface presentation information is presented in a Graphical User Interface, including a permission indicator and the information related to potential origination of the permission indicator.

In one embodiment, a computer readable storage medium having stored thereon, computer executable instructions that, if executed by a computer system cause the computer system to perform a method. In one embodiment, the method includes: gathering permission indication information including permission indications associated with various stored information; analyzing the permission indication information including analyzing potential permission indication origination; and creating interface presentation information based upon results of the analyzing the permission indications, wherein the interface presentation information includes information related to potential origination of a permission indication. The gathering can include scanning a file system and collecting active directory information. The analyzing can include determining the type of access a principal is given to a file. The analyzing can also include determining if a principal is associated with a group and the type of permissions given to the group. In one exemplary implementation, the permission indication information is organized in accordance with potential permission indication origination. In one embodiment, the interface presentation information is presented in a Graphical User Interface, including a permission indicator and the information related to potential origination of the permission indicator.

In one exemplary implementation, a computer system has a processor coupled to a computer readable storage media and the computer system executes computer readable code which causes the computer system to perform operations including: gathering permission indication information including permission indications associated with various stored information; analyzing the permission indication information including analyzing potential permission indication origination; and creating interface presentation information based upon results of the analyzing the permission indications, wherein the interface presentation information includes information related to potential origination of a permission indication. The gathering can include scanning a file system and collecting active directory information. The analyzing can include determining the type of access a principal is given to a file. The analyzing can also include determining if a principal is associated with a group and the type of permissions given to the group. In one exemplary implementation, the permission indication information is organized in accordance with potential permission indication origination. In one embodiment, the interface presentation information is presented in a Graphical User Interface, including a permission indicator and the information related to potential origination of the permission indicator.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 6 is a flow chart of an exemplary permission tracking method in accordance with one embodiment of the present invention.

FIG. 7 is a flow chart of an exemplary permission indication information gathering process in accordance with one embodiment of the present invention.

FIG. 8 is a block diagram of an exemplary permission indication information analysis method in accordance with one embodiment of the present invention.

FIG. 9 is a block diagram of exemplary interface presentation information creation process in accordance with one embodiment of the present invention.

FIG. 11 is a block diagram of an exemplary permission presentation interface in accordance with one embodiment of the present invention.

FIG. 12 is a block diagram of another exemplary permission presentation interface in accordance with one embodiment of the present invention.

FIG. 13 is a block diagram of another exemplary permission presentation interface after changes in accordance with one embodiment of the present invention.

FIG. 14 is a block diagram of another exemplary permission presentation interface in accordance with one embodiment of the present invention.

FIG. 15 is a block diagram of another exemplary permission presentation interface after changes in accordance with one embodiment of the present invention.

FIG. 16 is an illustration of another exemplary permission presentation interface in accordance with one embodiment of the present invention.

FIG. 17 is a block diagram of an exemplary permission tracking module in accordance with one embodiment of the present invention.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective permission tracking and maintenance. Present systems and methods facilitate determination and analysis of permission origination. For example, present system and methods facilitate analysis of whether permission is explicitly granted individually to a user or whether the user is granted permission indirectly. For example, whether the user is granted the permission by virtue of being a member of a user group that is granted the permission. In one embodiment, presentation information for presenting the permission information and potential permission origination in a convenient interface is automatically created. In one exemplary implementation, the permission information and potential permission origination indications are presented in a two dimensional array as part of graphical user interface (GUI).

It is appreciated that the present systems and methods can be implemented for storage of information (e.g., instructions, data, etc.) in a variety of storage resource configurations. The information can be stored in accordance with an organized hierarchy that utilizes a variety of hierarchy component designations (e.g., pathname component designations, etc.) for tracking the arrangement of information storage. For example, a pathname designation indicator can include pathname elements or components concatenated together with slashes. The pathname components can correspond to objects (e.g., directory designations, file name designations, etc.). For example, a pathname designation or indicator can identify a pathname by the expression directory_A/folder_B/filename_C. Each preceding pathname component or element can indicate the object that includes a following object. For example, the folder designated "folder_B" includes the file designated "filename_C".

Figure 1:
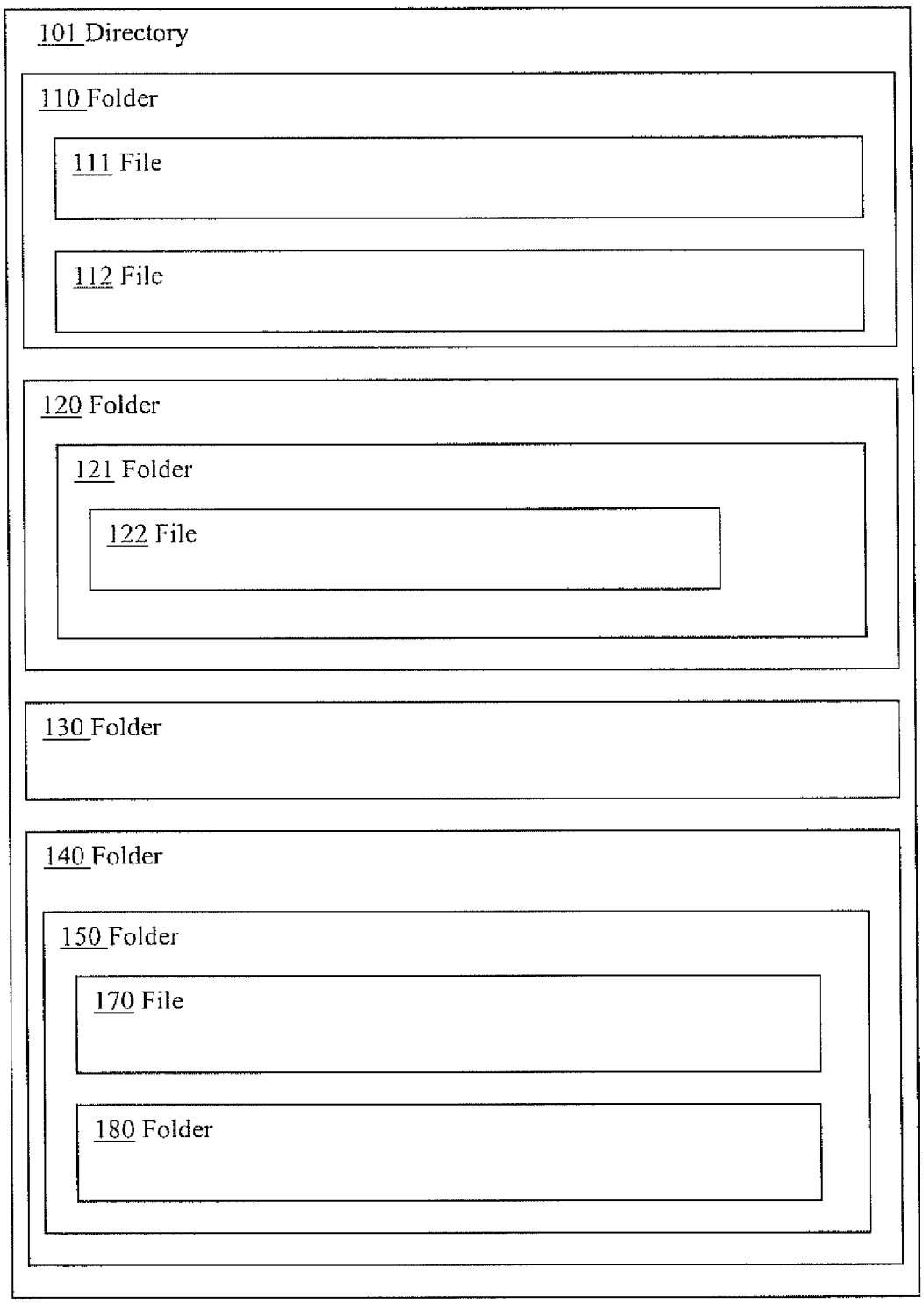
FIG. 1 is an exemplary block diagram of a storage hierarchy in accordance with one embodiment.

FIG. 1 is an exemplary block diagram of a storage hierarchy 100 in accordance with one embodiment. Directory alpha 101 includes folder 110, folder 120, folder 130, and folder 140. Folder 110 includes file 111 and file 112. Folder 120 includes folder 121 which includes file 122. Folder 140 includes folder 150 which includes files 170 and folder 180. It is appreciated that the files can include information. For example, the files can include various types of information (e.g., data, instructions, etc.). In one exemplary implementation, a file can include data (e.g., word programming files, video information, etc.) and/or programming instructions (e.g., software program instructions, executables, binaries, etc.) associated with a variety applications (e.g., word programming applications, accounting applications, internet applications, video applications, etc.).

Figure 2:
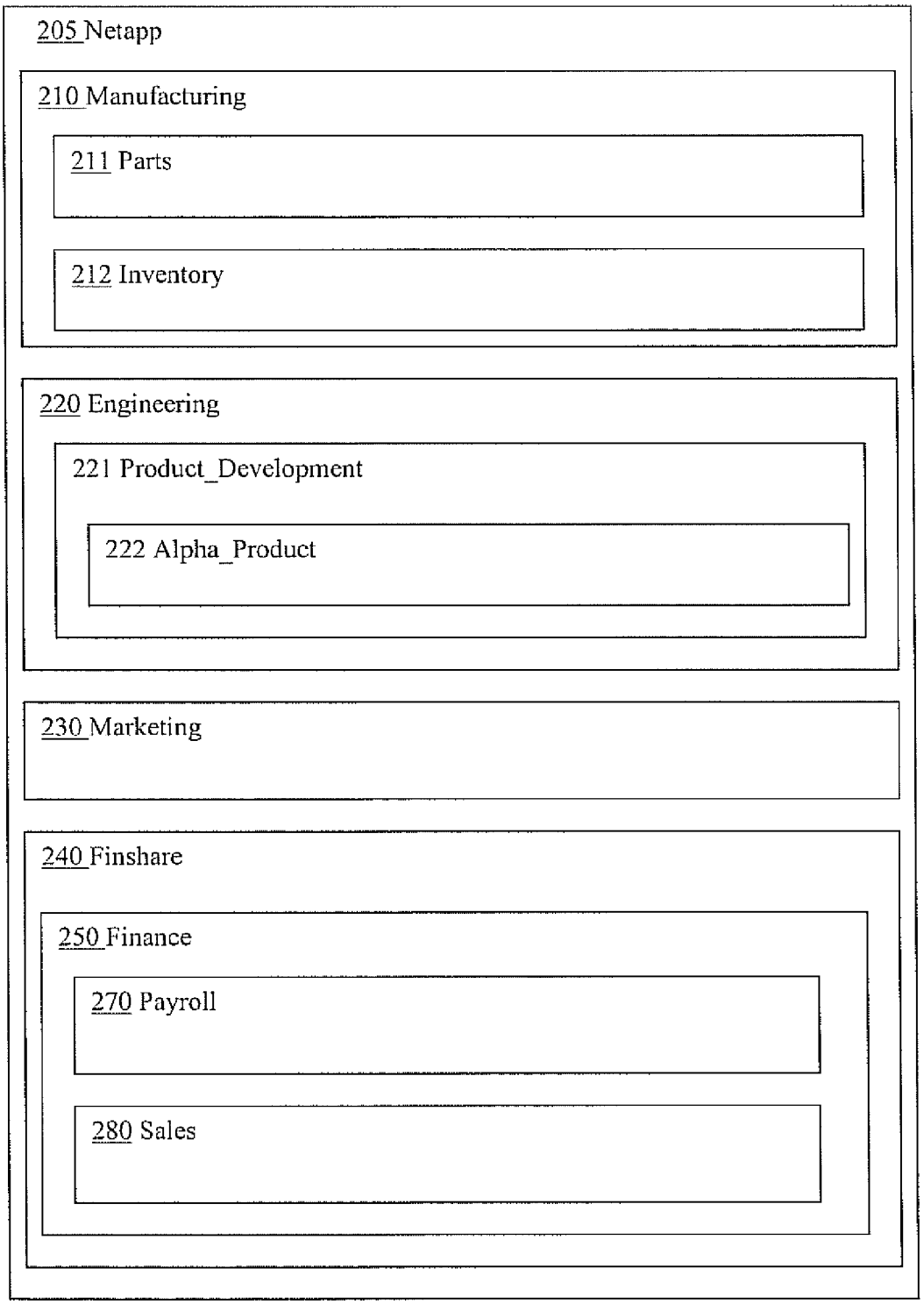
FIG. 2 is an exemplary block diagram of a storage hierarchy associated with corporate or enterprise activities in accordance with one embodiment.

It is appreciated a storage hierarchy can be associated with the storage of various information. FIG. 2 is an exemplary block diagram of a storage hierarchy 200 associated with corporate or enterprise activities in accordance with one embodiment. Netapp directory 205 includes manufacturing folder 210, engineering folder 220, marketing folder 230, and shared financial (finshare) folder 240. Manufacturing folder 210 includes part file 211 and inventory file 212. Engineering folder 220 includes product_development folder 221 which includes alpha_product file 222. Finshare folder 240 includes finance folder 250 which includes payroll file 270 and sales file 280.

Figure 3:
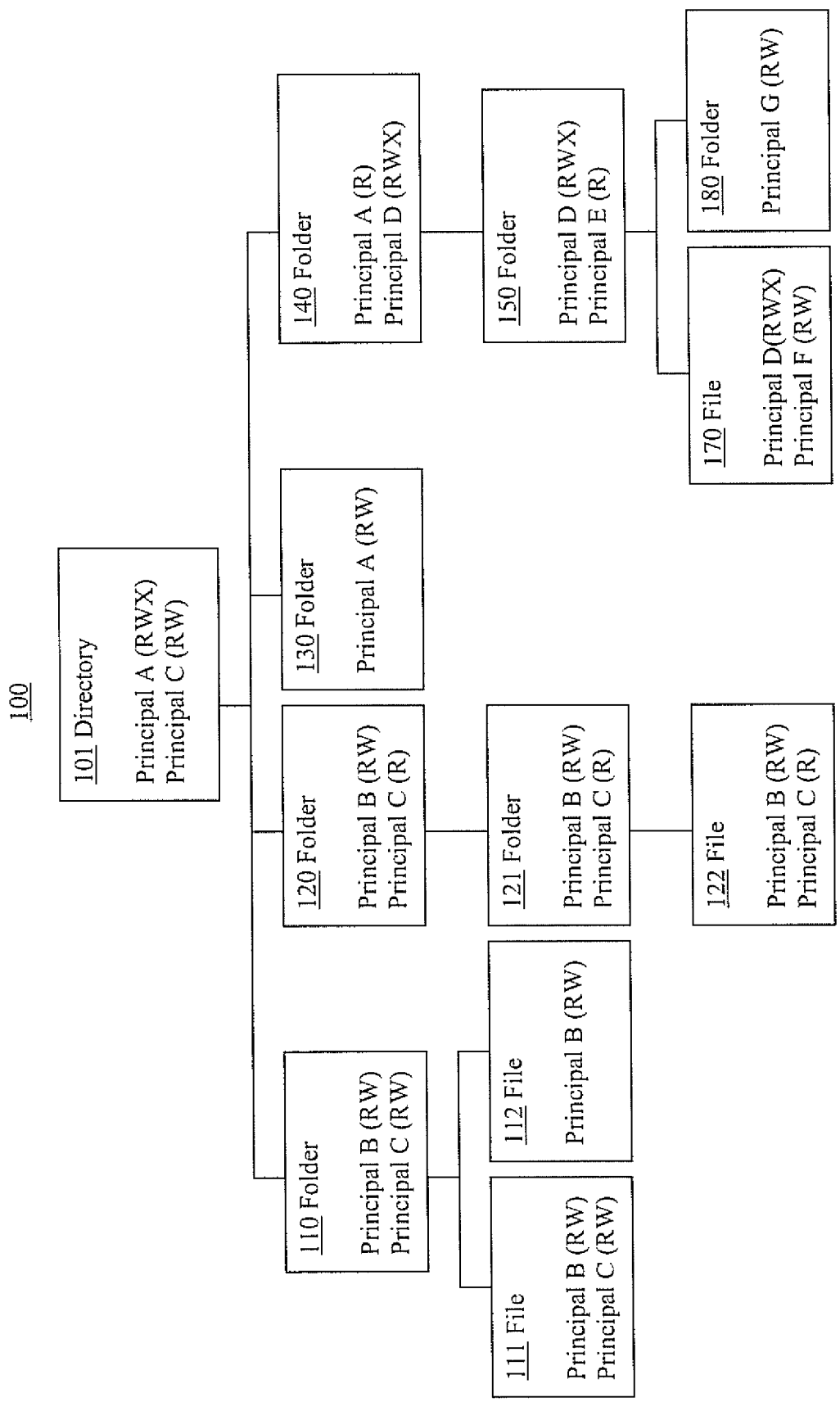
FIG. 3 is another exemplary block diagram representation of a storage hierarchy with permission indications in accordance with one embodiment.

Principals (e.g., users, user groups, etc.) are granted access to the information in accordance with designated permissions. The permissions determine the amount and type of interaction a principal can have with the information. It is appreciated present systems and methods can be implemented with a variety of permission indications (e.g., read, write, execute, etc.). FIG. 3 is another exemplary block diagram representation of storage hierarchy 100 in accordance with one embodiment. In one embodiment, the objects or components shown at a lower level are included in the corresponding higher level object. FIG. 3 also includes permission indications associated with the objects or storage pathname components. Indications of principals and their corresponding permissions are shown for each object or pathname component. It is appreciated the present systems and methods are readily implemented with a variety of permissions (e.g., a read (R) permission, write (W) permission, execution (X), etc.). For example, principal A has a read, write, execute (RWX) permission for directory 101.

Permissions can be "inherited" by a "child" or lower level pathname component from a "parent" or higher level pathname component. For example, the principal B read and write (RW) permission in files 111 and 112 can be inherited from folder 110. The permissions of a parent do not necessarily have to be inherited by a child. For example, principal C read and write (RW) permission in file 111 can be inherited from folder 110 while principal C read and write (RW) permission is not inherited in file 112 from folder 110. Permissions can be inherited through multiple "layers" of the pathname components. For example, principal B read and write (RW) permission and principal C read (R) permission in file 122 is inherited from folder 121 which inherited the permissions from folder 120.

A principal can be an individual user or a user group. A particular user can be granted permission explicitly as an individual or a user can be granted permission indirectly by virtue of being a member of the user group. In one exemplary implementation, a user is automatically granted the same permission that is granted to a user group the user belongs to.

Figure 4:
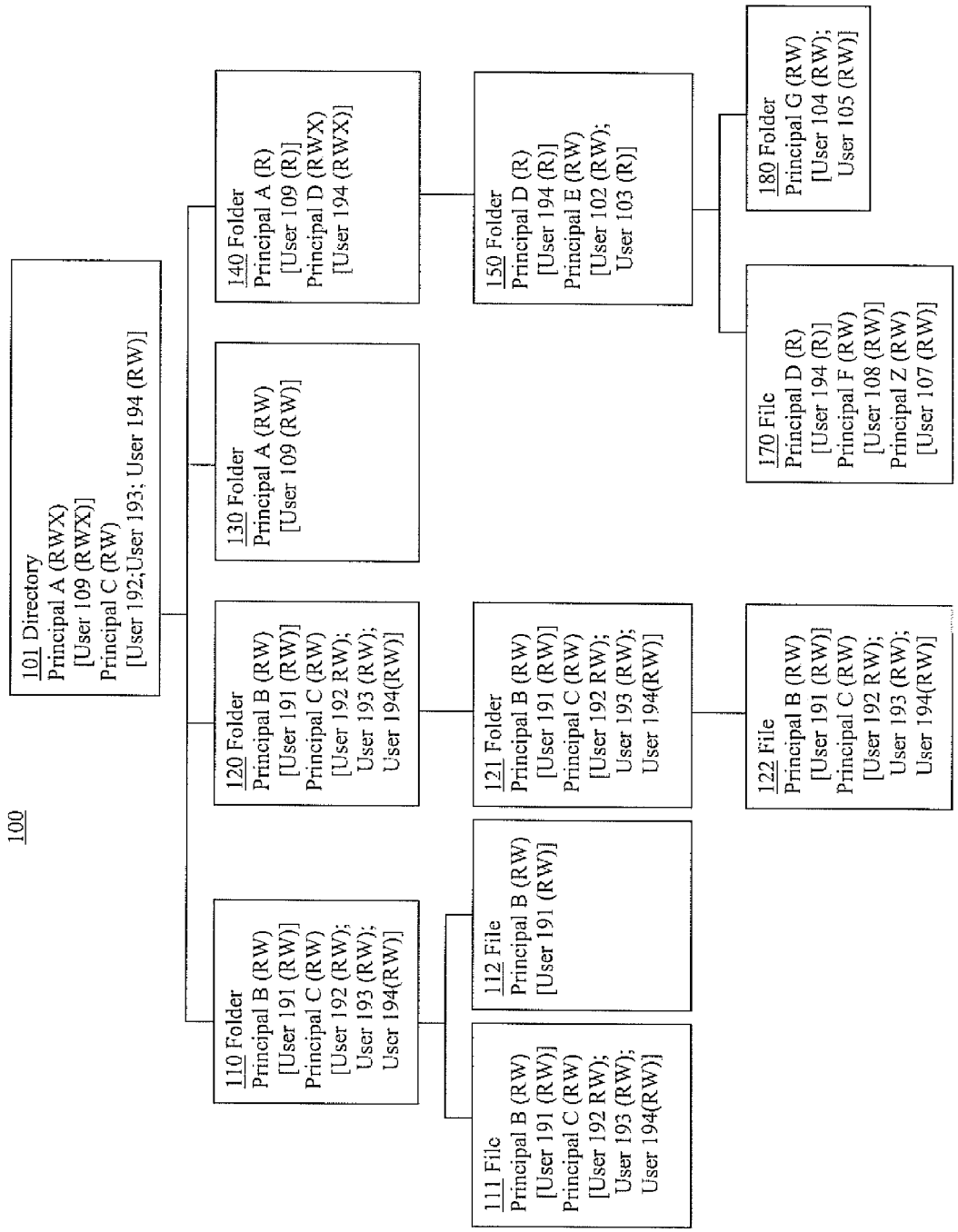
FIG. 4 is another exemplary block diagram representation of storage hierarchy showing a relationship of principal permissions and user permissions in accordance with one embodiment.

FIG. 4 is another exemplary block diagram representation of storage hierarchy 100 showing relationship of principal permissions and user permissions in accordance with one embodiment. Principal A corresponds to user 109 and user 109 is granted (RWX) permissions to directory 101, (RW) permissions to folder 130 and (R) permission to folder 140. Principal B is associated with user 191 and is given (RW) permissions to folders 110, 120, 121 and files 111, 112, and 122. Principal C corresponds to a user group that includes users 192, 193, and 194 which are given (RW) permissions to folders 110, 120, 121 and files 111, and 122. Principal D corresponds to user 194 which is given (RWX) permission to folder 140 and (R) permission to folder 150 and file 170. Principal E corresponds to a user group which is given (RW) permission and the user group includes users 102 and 103. Principal F corresponds to user 108 which is given (RW) permission to file 170. Principal G corresponds to user 104 and user 105 which are given (RW) permission to folder 180. Principal Z corresponds to user 107 which is given (RW) permission to file 170.

It is appreciated that present systems and methods can be implemented in a variety of configurations. A user can be given permission by both virtue of being a member of a group and individually as a user. For example, user 194 is given (RW) permission to folders 110, 120, 121 and files 111, 112, and 122 by virtue of being a member of a group (principal C) and user 194 is given (R) permission in folder 150 and file 170 as an individual user (principal D). Multiple users can be granted permission as part of a user group. For example, users 104 and 105 are granted (RW) permission as part of a user group (principal G). Multiple users can be granted permission to an object or component individually without being members of a group. For example, user 107 (principal Z) is granted (RW) permission to file 170 and user 108 (principal F) is granted (RW) permission to file 170. Users in a group are not necessarily granted the same permissions. For example, a user group (principal E) can be granted (RW) permission to folder 150, and user 102 which is part of the user group is granted (RW) permission to folder 150 while user 103 which is part of the user group is granted (R) permission to folder 150.

Figure 5:
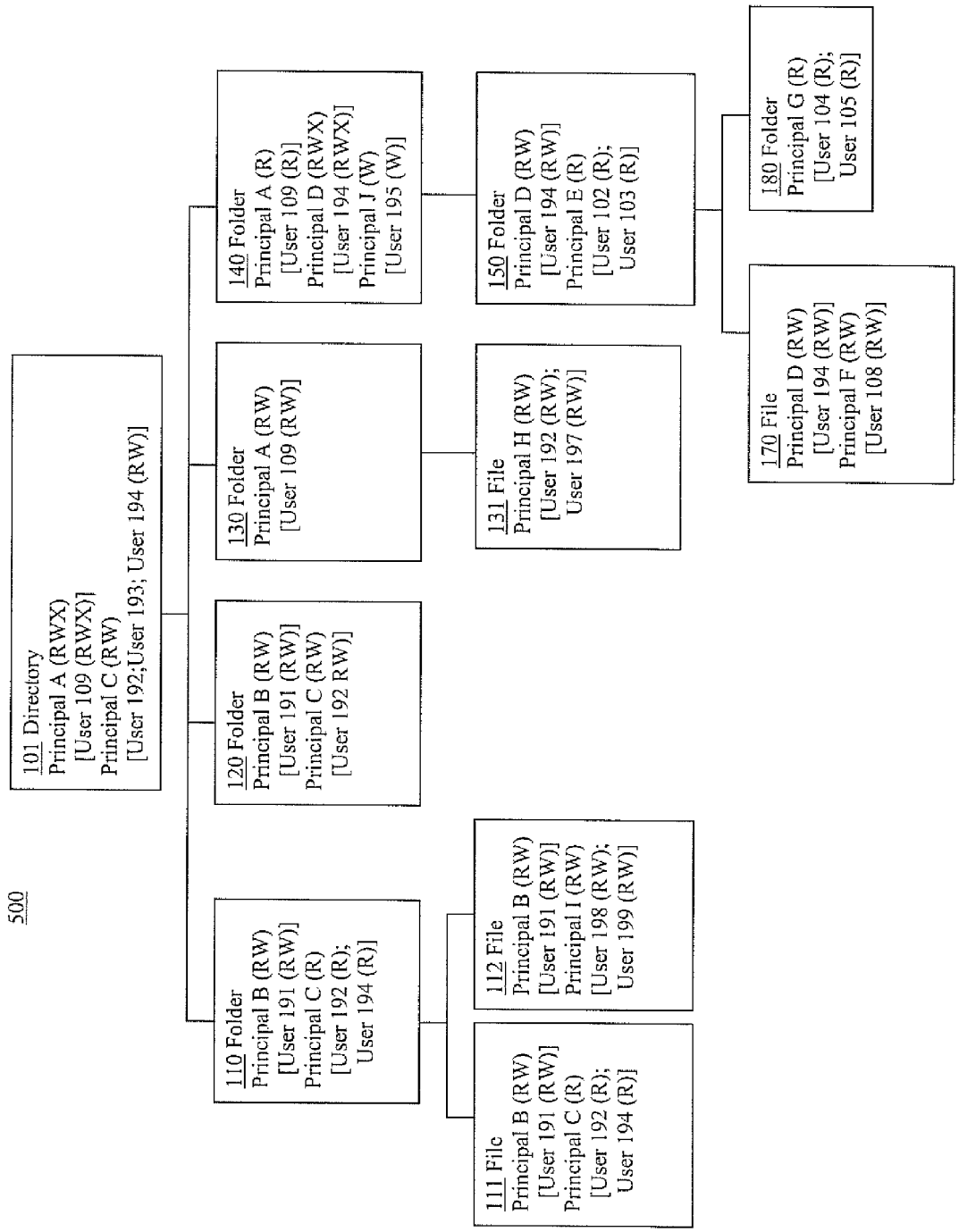
FIG. 5 is an exemplary block diagram of a storage hierarchy after changes in accordance with one embodiment.

It is appreciated that the storage hierarchical path components and permission configuration can change. FIG. 5 is an exemplary block diagram of a storage hierarchy 500 in accordance with one embodiment. Storage hierarchy 500 is the result of changes to storage hierarchy 100. For example, user 193 has been removed from Principal C user group in folders 110 and 120 and file 111. The write permission for Principal C user group has been removed from folder 110 and file 111 and the permission has changed to just (R). Folder 121 and file 122 have been deleted. File 131 has been added and new user group principal H has been added and given (RW) permission. User 192 and user 197 are associated with user group principal H and granted (RW) permission by virtue of being a member of the user group. New user group Principal I with user 198 and user 199 members are given (RW) permission to file 112. New user 195 (principal J) is granted (W) permission to folder 140. Write permission is added to user 194 (principal D) in folder 150 and file 170. Write permission is deleted from user group principal G folder 180. Read and write permission are removed for principal Z from folder 170.

Present systems and methods facilitate efficient and effective tracking and presentation of the permissions and potential origination of the permissions. FIG. 6 is a flow chart of an exemplary permission tracking method 600 in accordance with one embodiment of the present invention.

In block 610 permission indication information is gathered. The permission indication information can include permission indicators (e.g., read, write, execute, etc.) associated with various stored information. The permission indications can be associated with various stored information. In one embodiment, a permission indication information gathering process is performed. In one exemplary implementation, permission indication information includes permission indications for a principal with respect to a storage component and information on the potential origination of the permission. In one embodiment, the file system is scanned.

In block 620 the permission indication information is analyzed. In one embodiment, a permission indication information analysis process is performed. In one exemplary implementation, the permission indication information gathered in block 610 is parsed and the analysis includes analyzing potential permission indication origination. For example, a determination is made if a user is granted a permission individually or if the user is granted the information by virtue of being a member of a user group.

In block 630 interface presentation information is created based upon results of the permission indication analysis in block 620. In one embodiment the interface presentation information includes information related to potential origination of a permission indication. In one exemplary implementation, an interface presentation information creation process is performed. The interface presentation information can include information for presenting a two dimensional array presentation of user permissions and user group permission to path components in a storage path. The interface presentation information can be presented in a Graphical User Interface, including a permission indicator and information related to potential origination of the permission indicator.

FIG. 7 is a flow chart of exemplary permission indication information gathering process 700 in accordance with one embodiment of the present invention. In one embodiment, permission indication information gathering process 700 is a permission indication information gathering process performed in block 610. In one exemplary implementation, permission indication information gathering process 700 scans a file system to gather permission indication information. An entire file system can be scanned. The scanning can include collecting information from an access control list, active directory, etc.

In block 710, storage path component information is gathered for a designated storage object or path component. In one embodiment, path component or element indications that are in the storage path pointing to the designated storage component are determined. For example, if file 111 is the designated path component information that indicates folder 110 and directory 101 are in the path is gathered.

In block 720, indications of user groups a designated user belongs to are retrieved. In one embodiment, information indicating which user groups a user belongs to is collected from an active directory. In one exemplary implementation, information indication user 194 belongs to user group principal C is collected.

In block 730, permission indication information is gathered for the designated user and user groups identified in block 720 for each path component identified in block 710. In one embodiment, permission indication information is gathered from an access control list. In one exemplary implementation, permission indication information is gathered indicating user group principal C is granted read and write access to file 111.

FIG. 8 is a block diagram of an exemplary permission indication information analysis method 800 in accordance with one embodiment of the present invention. In one embodiment, the permission indication information analysis method 800 is a permission indication information analysis method performed in block 620. In one exemplary implementation permission indication information analysis method 800 determines characteristics associated with permission indications including potential origination of the permission indications.

In block 810 permission indication information is parsed. The permission indication information can be information gathered in a permission indication information gathering process (e.g., a permission indication information gathering process performed in block 610, exemplary permission indication information gathering process 700, etc.). In one embodiment, the parsing includes determining the type of access (e.g., read, write, execute, etc.) a principal is given to a path component (e.g., directory, folder, file, etc.).

In one exemplary implementation, the parsing includes determining if a principal is associated with a group and the type of permissions given to the group. The parsing can be performed on an access control list to determine which principal is given which permission to which path component. The parsing can be performed on active directory information to determine which user group a user is a member of.

In block 820, a potential permission indication origination is determined. In one embodiment, the information parsed in block 810 is organized in accordance with potential permission indication origination.

FIG. 9 is a block diagram of exemplary interface presentation information creation process 900 in accordance with one embodiment of the present invention.

In block 910 the presentation configuration information is developed. In one embodiment, information for generating a two dimensional graphical array of cells is developed. In one exemplary implementation, the automatically developed or generated information includes information defining the boundaries of the cells, information indicating the configuration of the cell boundary lines (e.g., width, height, color, etc), information describing the location of the cell on a presentation device (e.g., a monitor, screen, etc.).

In block 920 information for populating the cells is assigned to the cells of the array. In one embodiment, path component indicators, principal indicators and control point permission indicators (e.g., indicating a change of permission) are inserted in the appropriate cells. In one exemplary implementation, for each Access Control Entry in the Access Control List if the Access Control Entry's Principal is not either the user or the user-group that the Principal belongs to continue to the next Access Control Entry. If the Access Control Entry's Principal is either the user or the user-group that the Principal belongs to then determine if the Access Control Entry is explicit or inherited. If the Access Control Entry is explicit, assign or insert its permissions in the cell intersecting the Principal and the corresponding path component (e.g., file, folder, etc.) in the grid. If the Access Control Entry is inherited, get the inheritance source. If the inheritance source is one of the folder's ancestors, assign or insert the Access Control Entry permissions in the cell intersecting the Principal and the ancestor in the grid.

Figure 10:
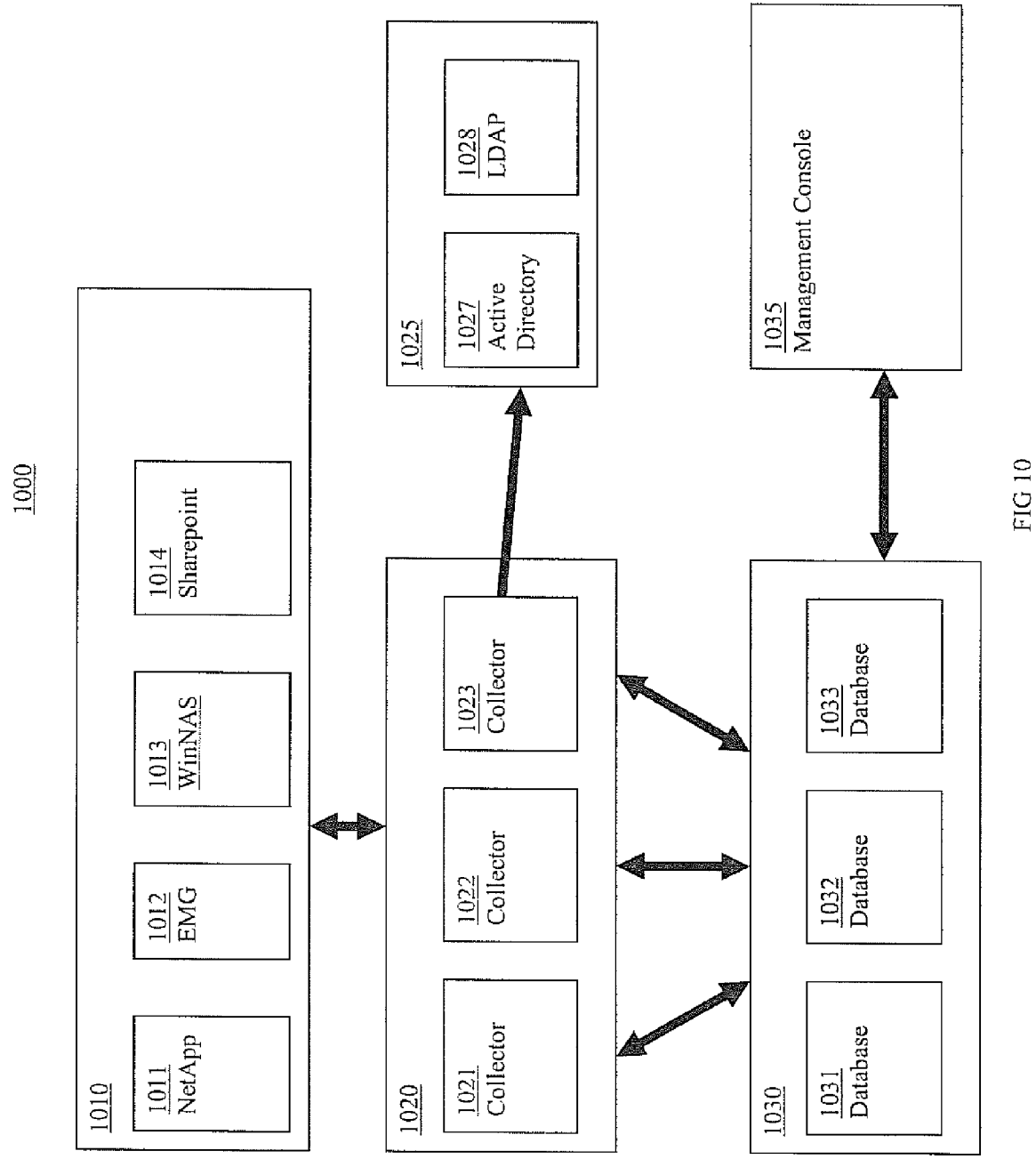
FIG. 10 is a block diagram of an exemplary permission tracking architecture in accordance with one embodiment of the present invention.

FIG. 10 is a block diagram of an exemplary permission tracking architecture 1000 in accordance with one embodiment of the present invention. Permission tracking architecture 1000 includes server level 1010 that includes various servers running applications, a collector level 1020 that includes collectors for collecting information and database level 1030 for organizing the collected information. Server level 1010 can include netapp 1011, EMC app 1012, WinNAS app 1013 and sharepoint app 1014. In one embodiment, collectors 1021, 1022 and 1023 in collector level 1020 gather information from file system management components 1025 (e.g., active directory 1027, LDAP 1028, etc.) and database components 1031, 1032 and 1033 in database level 1030 utilize organize the collected information. Management console 1035 can be utilized to query the database components and present information to a user. The level 1030 can include a variety of storage mechanisms and the management console 1035 can be web based. The collectors can include an audit data collector (e.g., Fpolicy, EMC even enabler, etc.), an active directory scanner, and a file system crawler (CIFS).

FIG. 11 is a block diagram of an exemplary permission presentation interface in accordance with one embodiment of the present invention. The permission presentation interface includes a two dimensional array. The y-Axis includes the principal 1111 (associated with User A), principal 1112 (associated with User Group B) and principal 113 (associated with User Group C). The x-Axis includes the path component 1121, path component 1122, path component 1123 and effective permissions for path component 1123. The array cells at the intersection of the x and y axis include control point permission indicators when there is a change in a permission indication. For example, control point permission indictor 1141 is included in the intersection cell of the x-axis path component 1123 and y-axis principal 1111. Control point permission indictor 1142 is included in the intersection cell of the x-axis path component 1122 and y-axis principal 1113. Control point permission indictor 1141 and 1142 are also included in the intersection cell of the x-axis effective permissions for path component 1123 and respective y-axis principal 1111 and y-axis principal 1113. In one embodiment, navigating the grid from left to right along a row gives effective permission of a user/group on the file/folder, while navigating from top to bottom along a column gives the effective permissions of the principal at the given path component. It is appreciated that the array can have various orientations. For example, the y-Axis can include the path components and x-Axis can include the principal indicators.

FIG. 12 is a block diagram of another exemplary permission presentation interface in accordance with one embodiment of the present invention. The permission presentation interface includes a two dimensional array indicating effective permission for user 194 to file 111 for a time corresponding to permissions shown in FIG. 4. The y-Axis includes the principal D (User 194) and principal C (User Group). The x-Axis includes directory 101 path component, folder 110 path component, file 111 path component and effective permissions for file 111 path component. Control point permission indictor (RW) is included in the intersection cell of the directory 101 path component and principal C (user group). A quick convenient visual review of the exemplary permission presentation interface indicates that User 194 effective (RW) permission for file 111 originated by virtue of User 194 being a member or user group C).

FIG. 13 is a block diagram of another exemplary permission presentation interface after changes in accordance with one embodiment of the present invention. The permission presentation interface includes a two dimensional array indicating effective permission for user 194 to file 111 for a time corresponding to permissions shown in FIG. 5. Control point permission indicator (RW) is included in the intersection cell of the directory 101 path component and principal C (user group). Control point permission indictor (R) is included in the intersection cell of the folder 110 path component and principal C (user group). Again, a quick convenient visual review of the exemplary permission presentation interface indicates that User 194 effective (R) permission for file 111 originated by virtue of User 194 being a member or user group C and a change in permission for folder 110.

FIG. 14 is a block diagram of another exemplary permission presentation interface in accordance with one embodiment of the present invention. The permission presentation interface includes a two dimensional array indicating effective permission for user 194 to file 170 for a time corresponding to permissions shown in FIG. 4. The y-Axis includes the principal D (User 194) and principal C (User Group). The x-Axis includes directory 101 path component, folder 140 path component, folder 150, file 170 path component and effective permissions for file 170 path component. Control point permission indictor (RWX) is included in the intersection cell of the folder 140 path component and principal D. Control point permission indictor (R) is included in the intersection cell of the folder 150 path component and principal D. Control point permission indictor (RW) is included in the intersection cell of the Directory 101 path component and principal C (user group). A quick convenient visual review of the exemplary permission presentation interface indicates that User 194 has effective (R) permission for file 170 originated as individual (rather than by virtue of a group) and inherited from folder 150.

FIG. 15 is a block diagram of another exemplary permission presentation interface after changes in accordance with one embodiment of the present invention. The permission presentation interface includes a two dimensional array indicating effective permission for user 194 to file 170 for a time corresponding to permissions shown in FIG. 5. Control point permission indictor (RWX) is included in the intersection cell of the folder 140 path component and principal D. Control point permission indictor (RW) is included in the intersection cell of the folder 150 path component and principal D has changed from FIG. 14. Control point permission indictor (RW) is included in the intersection cell of the Directory 101 path component and principal C (user group). A quick convenient visual review of the exemplary permission presentation interface indicates that User 194 has changed to effective (RW) permission for file 170 originated as individual (rather than by virtue of a group) and inherited from folder 150.

FIG. 16 is an illustration of another exemplary permission presentation interface in accordance with one embodiment of the present invention. FIG. 13 illustrates Tom's permission on folder—\\netapp1\Finshare\Finance\Payroll. The first column of the presentation array includes the user groups indications (guests@mydomain; accounts@mydomain) Tom is member of; and an individual indication (toma@mydomain) for Tom and effective permissions for Tom. The second column is associated with path component Finshare and indicates no permission changes are granted for this path component. The third column is associated with path component Finance and indicates a read (R) permission change for user group accounts@mydomain, tom@mydomain, and effective for tom@mydmain and a read and write permission denial for user group@mydomain. The fourth column is associated with path component Payroll and indicates a read (R) and write (W) permission change for tom@mydomain, and effective for tom@mydmain. The fifth column is associated with path component effective permission for Payroll and indicates a read (R) permission for group accounts@mydomain and a read (R) and write (W) permission change for tom@mydomain, and effective for tom@mydmain.

FIG. 17 is a block diagram of permission tracking module 1400 which includes instructions for directing a processor in performance of a permission tracking method (e.g., a cluster configuration method 600, etc.).

Permission tracking module includes permission indication information gathering module 1410, permission indication information analysis module 1420, and interface presentation information creation module 1430. Permission indication information gathering module 1410 includes instructions for performing a permission indication information gathering method. In one embodiment, permission indication information gathering module 1410 includes instructions for permission indication information gathering of block 610. Permission indication information analysis module 1420 includes instructions for performing a permission indication information analysis method. In one embodiment, permission indication information analysis module 1420 includes instructions for performing permission indication information analysis of block 620. Interface presentation information creation module 1430 includes instructions for performing an interface presentation information creation method. In one embodiment, interface presentation information creation module 1430 includes instructions for performing interface presentation information creation of block 630.

Figure 18:
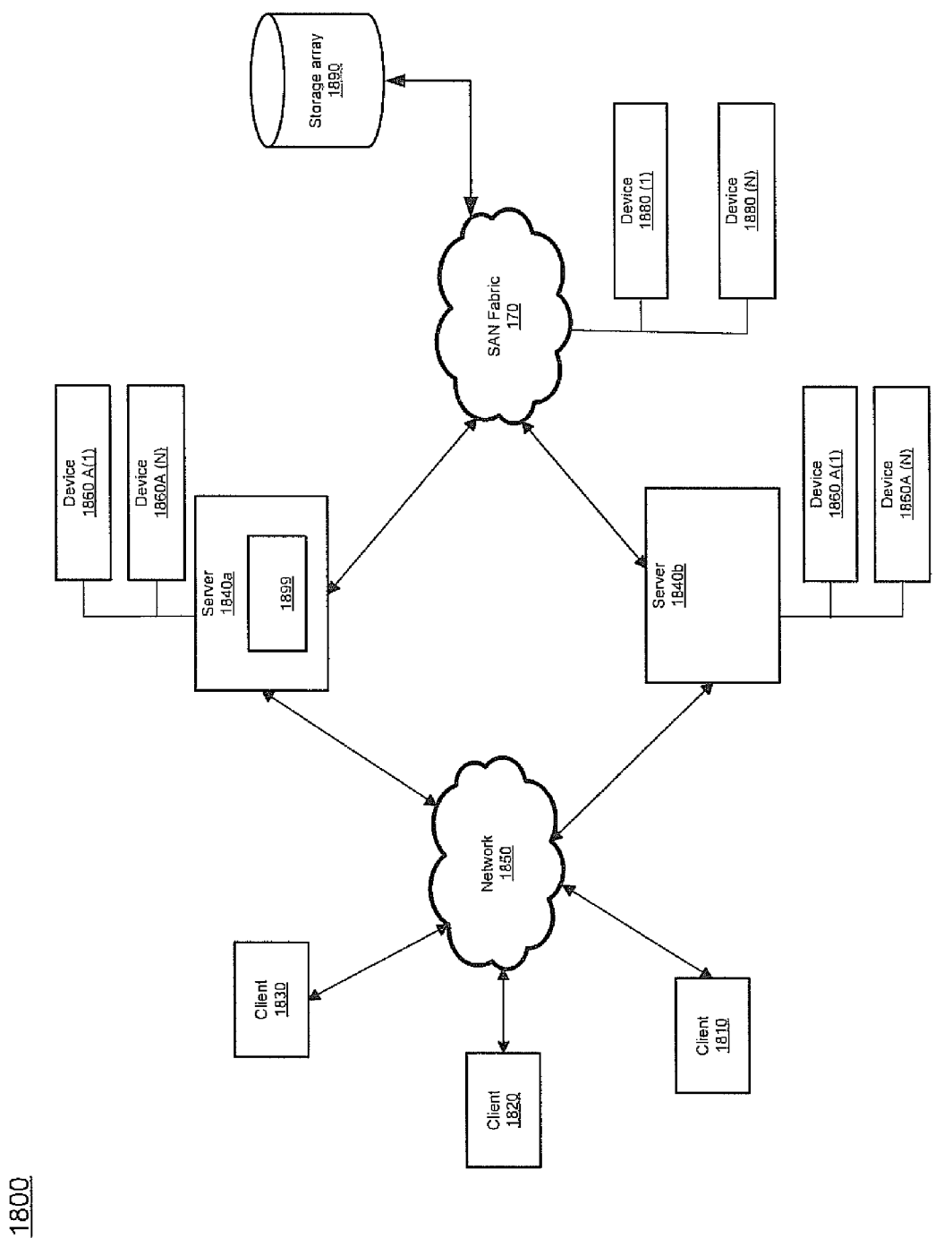
FIG. 18 is a block diagram depicting an exemplary network architecture in accordance with one embodiment of the present invention.

In one embodiment, permission tracking method 600 can be implemented on a network. FIG. 18 is a block diagram depicting a network architecture 1800 in which client systems 1810, 1820 and 1830, as well as storage servers 1840A and 1840B (any of which can be implemented using computer system 210), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes permission tracking module 1400. In one embodiment, permission tracking module 1899 is similar to similar to permission tracking module 1400. It is appreciated that present systems and methods are compatible with a variety of implementations. For example, portions of information and instructions associated with can be distributed in various resources.

Figure 19:
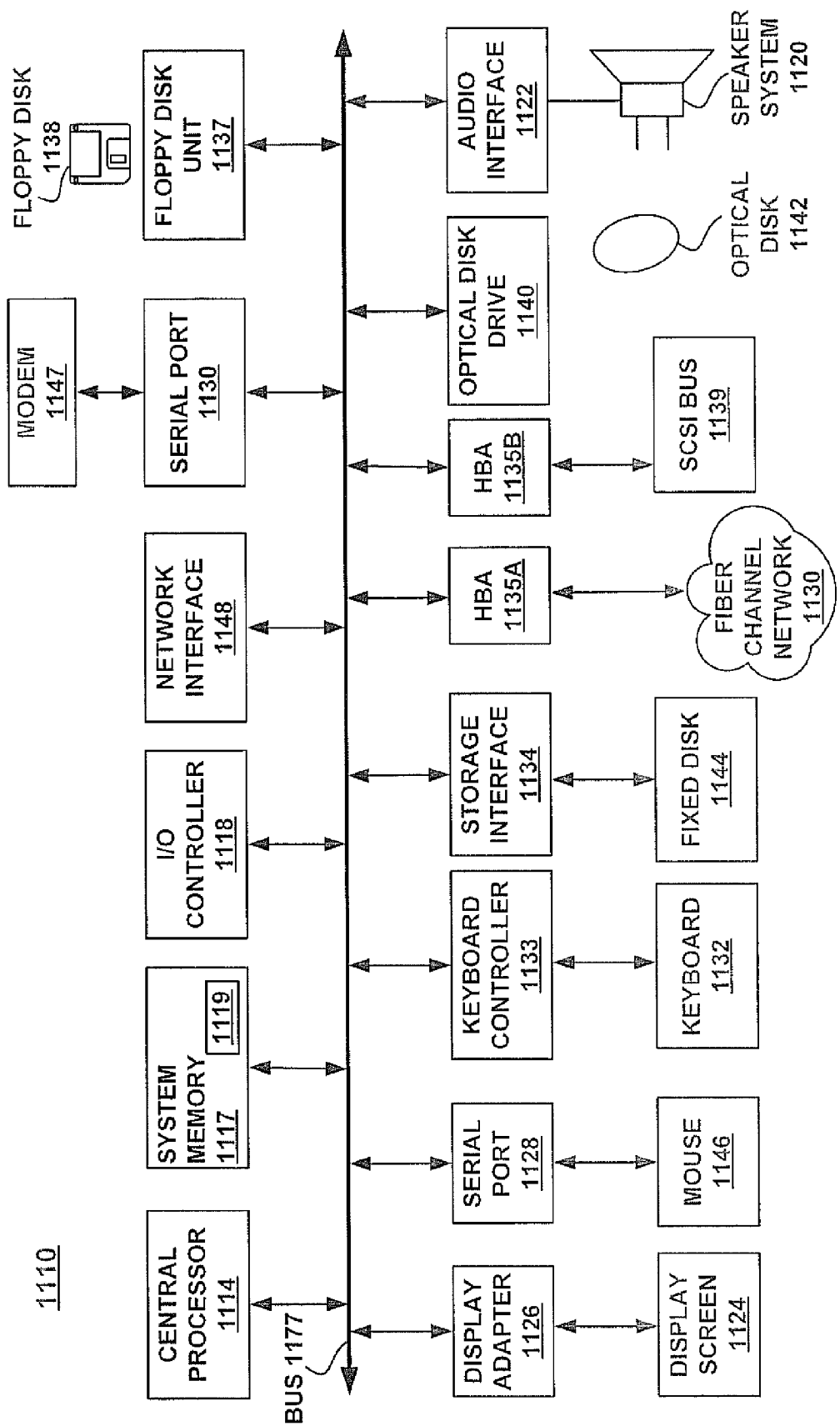
FIG. 19 depicts a block diagram of an exemplary computer system 1110 suitable for implementing the present methods.

FIG. 19 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing a permission tracking method (e.g., similar to permission tracking method 600) are stored in one or more memories of computer system 1100 (e.g., in memory location 1119). The RAM is generally the main memory into which the operating system and application programs are loaded. In one embodiment, RAM 1117 includes a permission tracking module (e.g., in memory location 1119). In one embodiment, a permission tracking module stored in memory location 1119 is similar to permission tracking module 1400. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 19 need not be present to practice the present disclosure. The devices and subsystems can be interconnected in different ways from that shown in FIG. 19. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on storage server 1840A or 1840B using, for example, a web browser or other client software (not shown). Such a client allows client systems 1810, 1820 and 1830 to access data hosted by storage server 1840A or 1840B or one of storage devices 1860A(1)-(N), 1860B(1)-(N), 1880(1)-(N) or intelligent storage array 190. FIG. 18 depicts the use of a network such as the Internet for exchanging data, but the present disclosure is not limited to the Internet or any particular network-based environment.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

Thus, present systems and methods can facilitate automated convenient and effective presentation of information access permission. In one embodiment, an interface includes an efficient visualization of permissions or access rights and potential origination of the permissions or access rights. The presentation can facilitate expedient and valuable tracking, maintenance and remediation of information access permissions. Present permission tracking methods and systems can enable rapid and accurate understanding of permissions and facilitate a variety of permission related activities. For example, present systems and methods can facilitate rapid and convenient response to a variety of audits (e.g., information security audit, standard operating procedure audits, regulatory audits, etc.).

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A permission tracking method comprising:
gathering permission indication information including permission indications associated with various stored information, wherein said permission indication information is gathered from a previously compiled access control list;
analyzing said permission indication information including analyzing potential permission indication origination, wherein said potential permission indication origination is determined by parsing said previously compiled access control list for a source of user permission information; and
creating interface presentation information based upon results of analyzing said permission indications, wherein said interface presentation information includes information related to potential origination of a permission indication, and said permission presentation interface includes a two dimensional array in which a first axis includes a principal indication and a second axis includes an indication of a path component, wherein array cells at an intersection aligned with said first axis and said second axis include control point permission indictors when there is a change in a permission indication.

2. The permission tracking method of claim 1 wherein said gathering includes scanning a file system.

3. The permission tracking method of claim 1 wherein said gathering includes collecting active directory information.

4. The permission tracking method of claim 1 wherein said analyzing includes determining the type of access a principal is given to a file.

5. The permission tracking method of claim 1 wherein said analyzing includes determining if a principal is associated with a group and the type of permissions given to the group.

6. The permission tracking method of claim 1 wherein said permission indication information is organized in accordance with said potential permission indication origination.

7. The permission tracking method of claim 1 further comprising presenting said interface presentation information in a Graphical User Interface, including a permission indicator and said information related to potential origination of said permission indicator.

8. A computer readable storage non-transitory medium having stored thereon, computer executable instructions that, if executed by a computer system cause the computer system to perform a method comprising:
gathering permission indication information including permission indications associated with various stored information, wherein said permission indication information is gathered from a previously compiled access control list;
analyzing said permission indication information including analyzing potential permission indication origination, wherein said potential permission indication origination is determined by parsing said previously compiled access control list for a source of user permission information; and creating interface presentation information based upon results of analyzing said permission indications, wherein said interface presentation information includes information related to potential origination of a permission indication, and said permission presentation interface includes a two dimensional array in which a first axis includes a principal indication and a second axis includes an indication of a path component, wherein array cells at an intersection aligned with said first axis and said second axis include control point permission indictors when there is a change in a permission indication.

9. The computer readable storage non-transitory medium of claim 8 wherein said gathering includes scanning a file system.

10. The computer readable storage non-transitory medium of claim 8 wherein said gathering includes collecting active directory information.

11. The computer readable storage non-transitory medium of claim 8 wherein said analyzing includes determining the type of access a principal is given to a file.

12. The computer readable storage non-transitory medium of claim 8 wherein said analyzing includes determining if a principal is associated with a group and the type of permission given to the group.

13. The computer readable storage non-transitory medium of claim 8 wherein said permission indication information is organized in accordance with said potential permission indication origination.

14. The computer readable storage non-transitory medium of claim 8 further comprising presenting said interface presentation information in a Graphical User Interface, including a permission indicator and said information related to potential origination of said permission indicator.

15. A computer system, comprising:
a computer system having a processor coupled to a computer readable storage non-transitory media and executing computer readable code which causes the computer system to perform operations including:
gathering permission indication information including permission indications associated with various stored information, wherein said permission indication information is gathered from a previously compiled access control list;
analyzing said permission indication information including analyzing potential permission indication origination, wherein said potential permission indication origination is determined by parsing said previously compiled access control list for a source of user permission information; and
creating interface presentation information based upon results of said analyzing said permission indications, wherein said interface presentation information includes information related to potential origination of a permission indication, and said permission presentation interface includes a two dimensional array in which a first axis includes a principal indication and a second axis includes an indication of a path component, wherein array cells at an intersection aligned with said first axis and said second axis include control point permission indictors when there is a change in a permission indication.

16. The computer system of claim 15 wherein said gathering includes scanning a file system.

17. The computer system of claim 15 wherein said gathering includes collecting active directory information.

18. The computer system of claim 15 wherein said analyzing includes determining the type of access a principal is given to a file.

19. The computer system of claim 15 wherein said analyzing includes determining if a principal is associated with a group and the type of permissions given to the group.

20. The computer system of claim 15 wherein said permission indication information is organized in accordance with said potential permission indication origination.

* * * * *